Dec. 3, 1940.　　V. W. EMBREE ET AL　　2,224,042
AIR PRESSURE CONTROL MEANS FOR TIRES
Filed May 23, 1939　　3 Sheets-Sheet 1
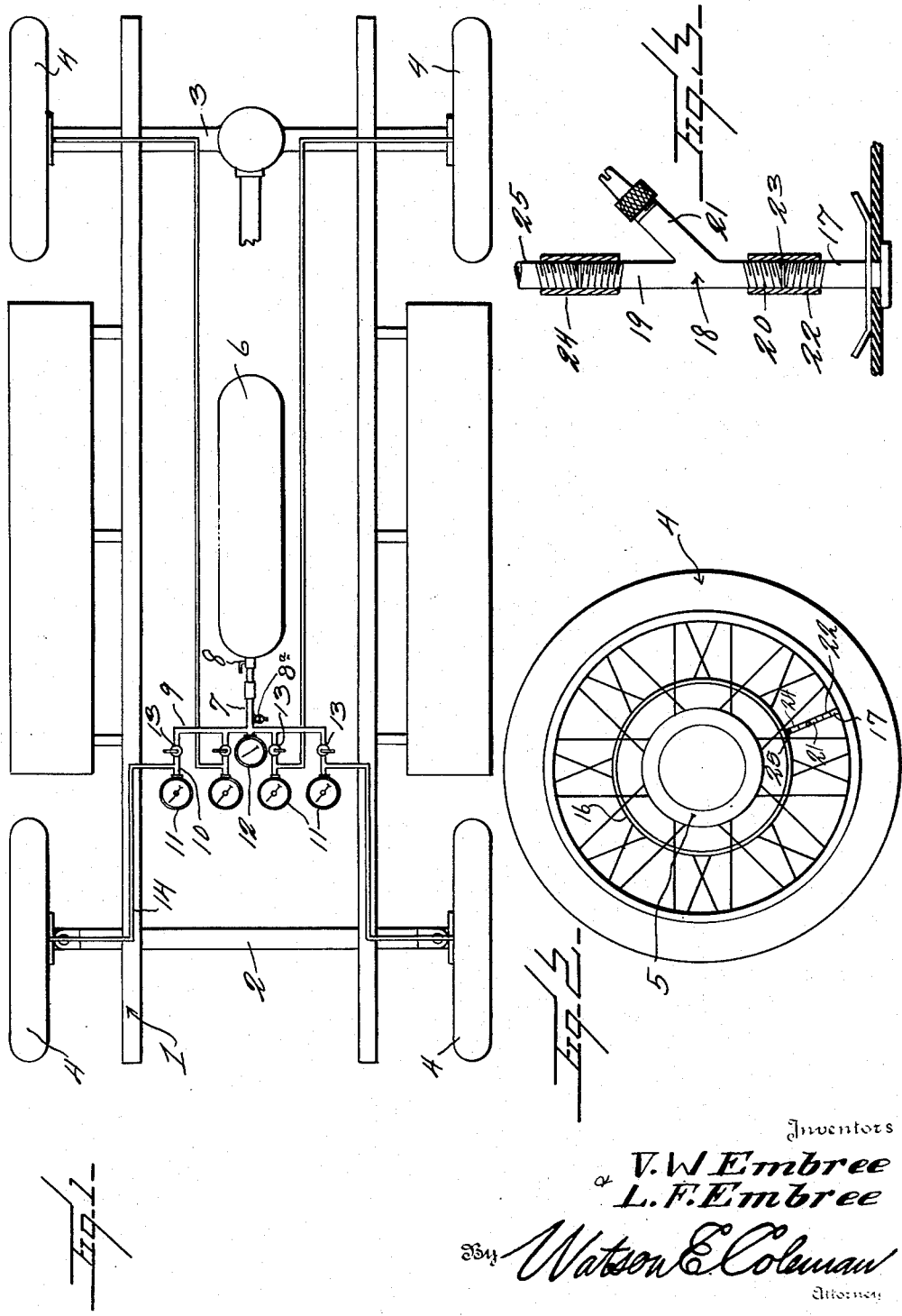
Inventors
V. W. Embree
L. F. Embree
By Watson E. Coleman
Attorney

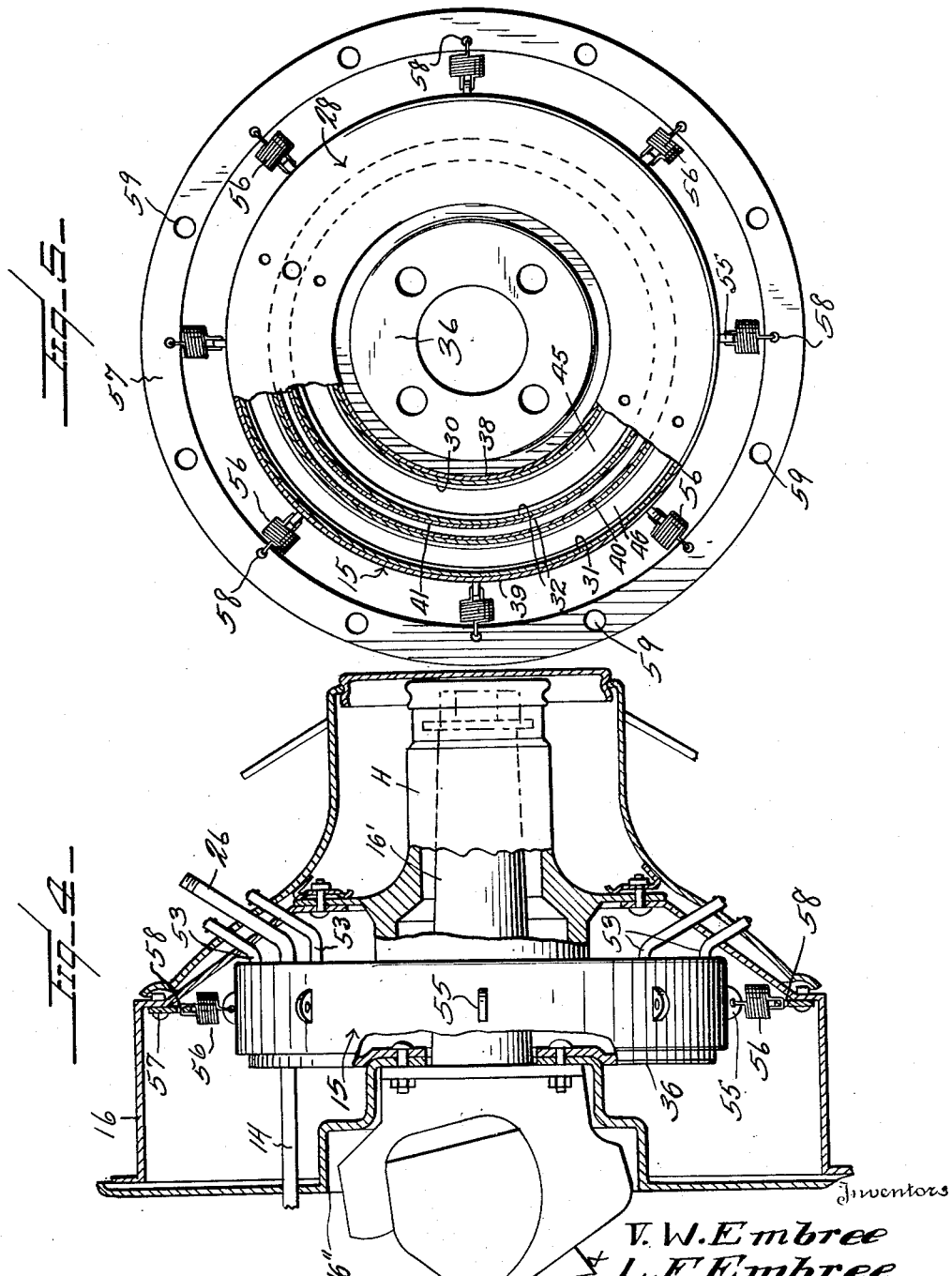

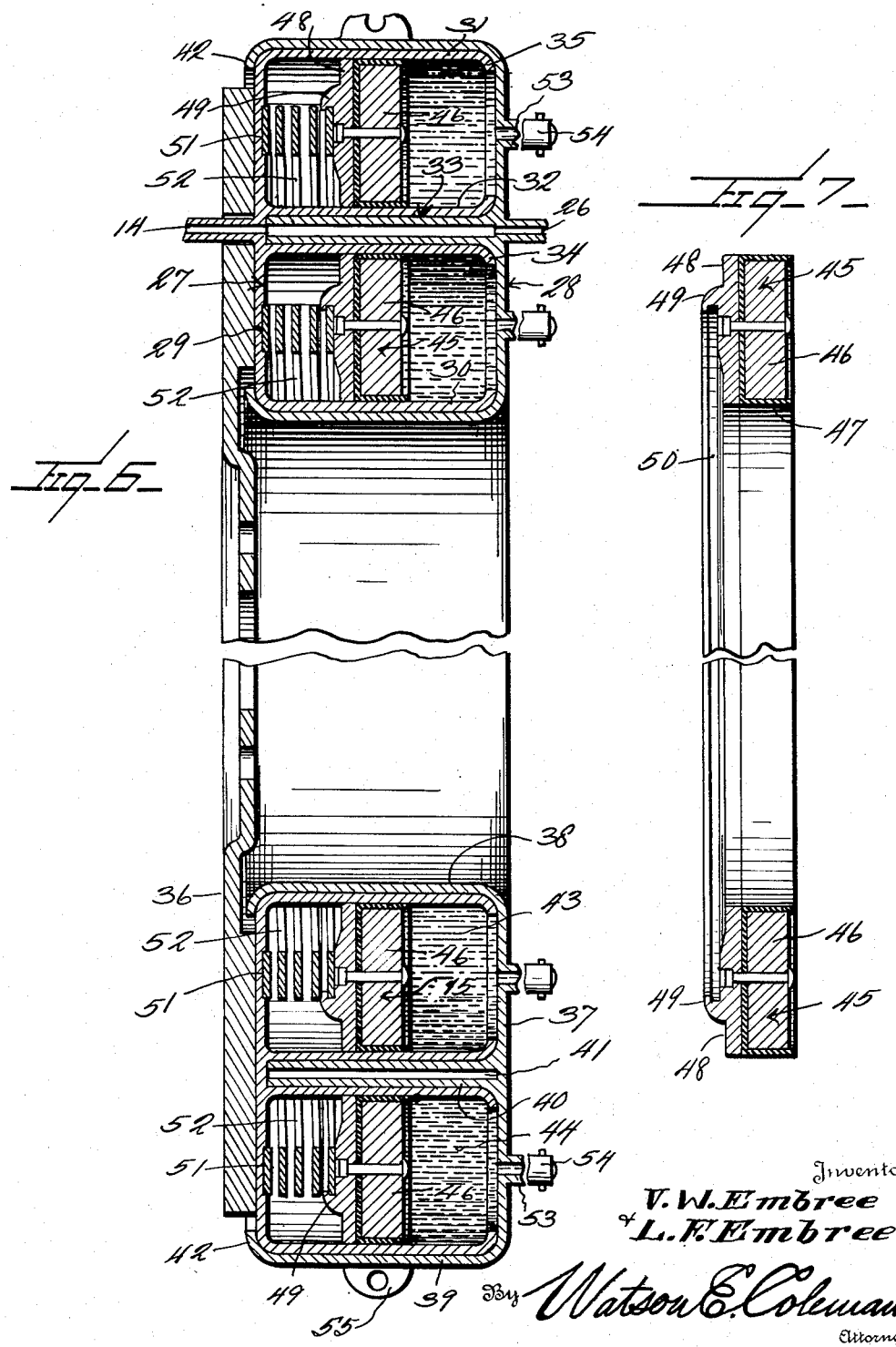

Patented Dec. 3, 1940

2,224,042

UNITED STATES PATENT OFFICE 2,224,042

AIR PRESSURE CONTROL MEANS FOR TIRES

Vern W. Embree and Leland F. Embree, Onida, S. Dak.

Application May 23, 1939, Serial No. 275,266

8 Claims. (Cl. 152—417)

This invention relates generally to the maintenance of air pressure in pneumatic tires such as are used upon automobiles, airplanes or the like, and pertains particularly to an improved system for accomplishing this object.

The primary object of the present invention is to provide a novel means for transferring air under pressure from a revolving unit to a stationary unit through the medium of a novel transfer chamber, whereby in the employment of the present system upon motor vehicles, airplanes or like structures employing pneumatic tires, air may be conveniently released from such tires while the same are rotating.

Another object of the present invention is to provide a novel means for transferring air under pressure from a stationary unit to a revolving unit through the medium of a novel transfer chamber, whereby in the employment of the present system upon motor vehicles, airplanes or like structures employing pneumatic tires, air may be conveniently supplied to such tires while the same are rotating.

Another object of the invention is to provide a novel system for maintaining air at a desired pressure in the several tires of a wheeled structure and for facilitating the adjustment of such pressures in the individual tires whereby the pressures may be maintained constant and the same in all of the tires of the vehicle.

Another object of the invention is to provide a novel means whereby air may be introduced into a pneumatic tire through a valved unit which is so designed that it may be coupled with a source of air under pressure on a vehicle and with a gauge device, thus permitting the tire to be supplied with air from the vehicle carried source, when desired, through the manipulation of suitable valves.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 illustrates in plan a vehicle chassis showing the lay-out of the air supply and pipe system for the vehicle tires constructed in accordance with the present invention.

Fig. 2 is a view in elevation of a vehicle wheel showing the arrangement of the two-way valve conduit by which connection is established between the air transfer unit and the pneumatic tire.

Fig. 3 is a view in side elevation of the two-way valved conduit.

Fig. 4 is a view in side elevation of the air transfer unit showing the manner in which the same is mounted within the hub of a wheel.

Fig. 5 is a view in front elevation of the air transfer unit.

Fig. 6 is a diametrical section through the air transfer unit of a wheel.

Fig. 7 is a diametrical section through an annular piston forming a part of the unit.

Referring now more particularly to the drawings, Fig. 1 shows in plan a conventionally illustrated motor vehicle chassis, the front and rear axles being indicated by the numerals 2 and 3, respectively, while the wheels are generally designated 4, the hub of each wheel being indicated by the numeral 5.

Fig. 1 shows the general lay-out for the pipe system and compressed air source which is to be carried upon the vehicle. The air source may be in the form of a tank 6 mounted in any convenient manner upon a vehicle and from one end of this tank an outlet pipe 7 leads, which is controlled by a valve 8 and is connected with a distributing pipe 9 from which leads four branches 10, each of which has a pressure gauge 11 connected therewith. A similar pressure gauge 12 is directly connected with the distributing pipe 9 so that the pressure of air within the supply tank 6 may be observed and each of the branches 10 has therein a control valve 13 so that the flow of air therethrough may be regulated.

Connected with each branch 10 of the air distributing pipe 9 is a pipe line 14 which leads to a wheel, the connection of each pipe line with the branch pipe 10 being between the valve 13 and the pressure gauge 11. Each of these air conducting pipes 14 leads to a transfer unit of a wheel, which unit is illustrated in detail in Figs. 4 to 7.

In the pipe line 7 which leads from the air tank 6 to the distributing pipe 9, there is connected a valved outlet 8ª by means of which, when the valve 8 is closed, air may be exhausted from any one of the tires through the pipes 10 and 14 connected therewith, after the associate valve 13 has been opened, when a gauge 11 indicates that the air in the tire with which it is connected has assumed an excessive or undesirable pressure.

The transfer unit associated with each wheel is shown in side elevation in Fig. 4 and is indicated as a whole by the numeral 15. This unit is mounted within the portion 16 of the vehicle wheel in which the brake mechanism is housed, such mechanism not being shown. The unit is disposed in encircling relation with the axle 16' of the wheel, on which axle the hub H is rotatably mounted in the usual manner. The portion of the wheel which is indicated by the numeral 16" constitutes the stationary part of the wheel assembly on which the brake mechanism, not shown, is mounted, this part of the wheel structure being secured against rotation to the inner end of the axle 16' in the customary manner. This unit 15 is for the transferral of air from the stationary or non-moving part of the wheel structure to the moving part so that it may be conveniently carried to the adjacent tire and each tire inner tube has connected with the regular valve stem 17 thereof, a two-way conduit which is indicated generally by the numeral 18 and shown in side elevation in Fig. 3. This conduit consists of the straight body portion 19, each end of which is screw threaded, as indicated at 20, and the intermediate branch portion 21 which houses the usual valve inside unit (not shown) which is found in every inner tube valve and which functions to permit air to be introduced into the inner tube, but closes immediately upon the removal of the air introducing pipe so as to prevent the escape of such air. One end of the body 19 is connected to the tire inner tube stem 17 by the sleeve 22 which is provided with suitable right and left-hand threads upon its interior for coupling the oppositely threaded adjacent ends of the stem 17 and body 19 whereby these may be drawn tightly together against a suitable interposed gasket 23.

The other end of the body 19 is also connected by a sleeve 24, corresponding with the sleeve 23 with a pipe line 25 which leads to the outer or rotating portion of the transfer unit 15 being coupled at its other end with the inlet pipe 26 which is carried by the rotating part of the unit.

The air transfer unit 15 consists of two annular shells which are indicated generally by the numerals 27 and 28, which may be referred to as the stationary and movable shells or the primary and secondary shells, respectively. The primary shell comprises a side wall plate 29 and the inner and outer parallel circular walls 30 and 31, respectively, with a central slotted or recessed wall 32 which is integral with the side wall 29 and is concentric with the walls 30—31 and is opened at its outer edge. This slotted central wall 32 provides an annular chamber 33 for the purpose hereinafter described and the free edges of the two sides of the slotted wall 32 are turned, as indicated at 34, toward the inturned edges 35 of the adjacent inner and outer walls 30—31. The primary shell is arranged concentrically with the wheel axle within the hub portion 16 and is mounted upon a suitable mounting plate 36 which is secured to the stationary part 16" of the wheel assembly on which the fixed parts of the wheel brake (not shown) are mounted. Connected with the primary or stationary shell 27 is the outlet end of a pipe 14 which leads from the compressed air supply source 6.

The movable or secondary shell 28 is of substantially the same form as the shell 27 in that it consists of a side wall plate 37 which is formed integral with the concentric inner and outer circular walls 38 and 39, respectively, and has extending from its central part the inwardly directed slotted annular wall 40 which is open at its free edge and which provides a central chamber 41. This secondary shell receives between its inner and outer walls 38—39, the inner and outer walls 30—31 of the inner or primary shell and the slotted central annular wall 40 extends into the chamber 33 which is provided by the slotted wall 32 of the stationary shell, extending into the inner side of the side wall plate 29, as shown in Fig. 6. The thickness of the slotted wall 40 of the movable or rotary shell is such as to fit snugly in the chamber 33 of the fixed shell slotted wall and in order to lock these nested annular shells together, the free edges of the inner and outer walls of the secondary shell are turned to form the locking flanges 42 which engage against the outer side of the plate 29 of the fixed shell.

By the construction described, there are provided three concentrically arranged annular chambers within each wheel hub, one chamber having been already referred to and indicated by the numeral 41 and the other two chambers being formed by the nested relation of the inner and outer walls of the fixed and stationary shells and being indicated by the numerals 43 and 44.

Within each of the annular chambers 43—44 is an annular piston unit or follower which is shown in Fig. 7 in diametrical section and is generally indicated by the numeral 45. These piston units comprise a ring 46 having over one flat side and the two edges thereof the packing covering 47 which may be of leather or other suitable material and which is tightly compressed between the edges of the ring and the circular walls of the chamber in which the piston is located. This packing has an edge portion which extends beyond one side face of the ring 46 so that it may be caused to tightly adhere to the wall of the chamber by the pressure exerted thereon by material located in the chamber in front of the piston, such material being, in the present structure, grease of a suitable character which is introduced into the chambers as hereinafter described.

Secured to the back of each ring 46 is an annular plate 48 which is provided with a rib 49 upon its back face which in its inner face has formed a channel or groove 50. The inner face of the plate 29, within each of the chambers 43 and 44, has formed therein a groove 51 and in each of these annular grooves there is seated one end of a helical spring 52, the other end of which bears against the plate 48 of the adjacent piston unit and is engaged in the channel 50 of the flange 49 of that plate and by this means is held against movement radially in the chamber.

The side wall 37 of the outer or secondary unit carries the diametrically oppositely disposed pairs of tubes 53, each of which at its outer end has connected therewith an automatically closing grease valve fitting 54. One of these tubes of each pair opens into a chamber 43 while the other tube of each pair opens into the other chamber 44. Thus each chamber has two tubes opening thereinto at diametrically opposite sides of the transfer unit by means of which grease of a suitable character may be introduced into the chambers against the faces of the pistons or annular followers 45.

The outer circular wall 39 of the secondary or movable shell 28 is provided with a plurality of outwardly extending ears 55 to each of which is attached an end of a contractile spring 56. Within the hub 16 of each wheel is secured a suspension ring 57 which is provided with a series of apertures 58 by means of which the other ends of the spring 56 may be connected therewith. This ring may be secured in any suitable means to the body of the hub, but is shown in Fig. 5 as having apertures 59, for the reception of bolts 59', Fig. 4, by which it may be attached to the hub. In place of using attaching bolts, this ring may be welded to the hub, if desired.

By the provision of an equal number of springs 56, properly spaced around the transfer unit, and by providing springs of equal tension, the unit may be kept properly centered with respect to the stationary part of the wheel structure which it encircles and the rotary or secondary shell may be held in the proper relation with the fixed shell 27 so that although there is a relatively close fit between the adjacent annular portions or walls of the shell, there will not be more pressure between such walls at one side of the unit than at the other.

In the use of the present system, each of the chambers 43 and 44 will be filled with a suitable heavy grease such as bearing, fibre or pump grease under pressure, which will effect the movement of the annular pistons or followers to compress the springs 52. This grease will work in between the opposing faces of the walls of the nested shells and will be under constant pressure due to the action of the springs 52 and followers 45 so that it will resist the escape of air from the transfer chamber 41 between the contacting faces of the slotted walls 32 and 40. Thus the shell 28 which is connected with the vehicle tire inner tube may rotate freely about the shell 27 which is fixed and which is connected by the tubes or pipes 14 with the air distributing pipe 9 and the source of air under pressure which is the tank 6 and no air can be lost during the period of its transfer from the moving to the stationary part of the transfer unit.

By providing the two sets of grease inlet tubes at opposite sides of the transfer unit, the escape of trapped air in the chambers is provided for as the chambers are being filled with the grease.

With the arrangement illustrated in Fig. 1, when the several pressure gauges and valves are conveniently located on the instrument board of the vehicle or plane, the operator can maintain a constant watch on the condition of the several tires and when anyone shows a pressure different from the others, the pressure may be readily altered in the manner desired, that is, either by raising or lowering it.

It is well known that the air pressure of pneumatic tires, particularly tires of motor vehicles, frequently increases to a dangerous point during continued driving of the vehicle in hot weather and such increase in pressure as a result of friction, has frequently resulted in the rupture of the tire with serious results. By the provision in the present system of the pipe lines and gauges, together with the means described for transferring air from the moving wheel to the adjacent stationary portion of the vehicle structure, and the exhaust valve 8ª, the operator of a vehicle equipped with this mechanism may, when he notes upon his gauges that any one or all of the tires is developing an excessive pressure, relieve such pressure by opening the bleed valve 8ª and then opening any one or all of the valves 13 until the gauges 11 show that the tire pressures have been reduced to the proper degree. It will also be readily apparent that by the same means, with the exception of the bleed valve 8ª, the air pressures in the tires may be raised to a normal or desired condition by opening the valve 8 and any one or all of the valves 13, until the indicators 11 show that the tire pressures have been raised to the extent desired.

What is claimed is:

1. In a vehicle wheel assembly, means for transferring air under pressure from a fixed part of the assembly to a rotary part thereof which comprises a pair of annular shells arranged in concentric nested relation and in concentric relation with said wheel, one of said shells being fixed to the fixed part of the wheel assembly, the other of the shells being attached to the rotary part of the wheel assembly, each of said shells having within itself an annular slotted wall, one of said slotted walls being extended into the other slotted wall, the inner wall of the slotted walls constituting an air chamber, means for connecting an air conducting pipe with the interior of each of said slotted walls, the interiors of said walls being in communication, the said shells together forming annular chambers encircling said slotted walls, and means for maintaining grease under pressure in said annular chambers.

2. In a vehicle wheel assembly, means for transferring air under pressure from a fixed part of the assembly to a rotary part thereof which comprises a pair of annular shells arranged in concentric nested relation and in concentric relation with said wheel, one of said shells being fixed to the fixed part of the wheel assembly, the other of the shells being attached to the rotary part of the wheel assembly, each of said shells having within itself an annular slotted wall, one of said slotted walls being extended into the other slotted wall, the inner wall of the slotted walls constituting an air chamber, means for connecting an air conducting pipe with the interior of each of said slotted walls, the interiors of said walls being in communication, the said shells together forming annular chambers encircling said slotted walls, said chambers being designed to contain a sealing substance for introduction between the opposing faces of the slotted walls, and means in the chambers for constantly urging said sealing substance between the said opposing faces of the slotted walls.

3. In a vehicle wheel assembly, comprising a stationary and a rotary part, means for transferring air under pressure from one of said parts to the other, comprising a pair of annular shells arranged in concentric relation and concentrically with the wheel, each of said shells including a side wall portion and inner and outer concentric circular walls, each shell being open at the side opposite its side wall, said shells being in nested relation whereby the inner and outer walls of one are enclosed between the inner and outer walls of the other and the open sides of the shells are oppositely directed, each of said shells including a central annular slotted wall open at its free edge, the slotted wall of one shell being extended into the slotted wall of the other shell, an air pipe connected with each of said shells and in communication with the interior of the slotted wall thereof, one of said shells being secured to the fixed portion of the wheel assembly, the other of the shells being attached to the rotating portion of the wheel assembly, the nested shells forming a pair of annular chambers between which the slotted walls are located, said chambers being designed to contain a sealing substance to be forced therefrom between the opposing surfaces of the fixed and movable shells, and means for effecting the movement of the sealing substance from the chambers between the relatively fixed and movable opposing walls.

4. In a vehicle wheel assembly, comprising a stationary and a rotary part, means for transferring air under pressure from one of said parts to the other, comprising a pair of annular shells arranged in concentric relation and concentrically with the wheel, each of said shells including a side wall portion and inner and outer concentric circular walls, each shell being open at the side opposite its side wall, said shells being in nested relation whereby the inner and outer walls of one are enclosed between the inner and outer walls of the other and the open sides of the shells are oppositely directed, each of said shells including a central annular slotted wall open at its free edge, the slotted wall of one shell being extended into the slotted wall of the other shell, an air pipe connected with each of said shells and in communication with the interior of the slotted wall thereof, one of said shells being secured to the fixed portion of the wheel assembly, the other of the shells being attached to the rotating portion of the wheel assembly, the nested shells forming a pair of annular chambers between which the slotted walls are located, said chambers being designed to contain a sealing substance to be forced therefrom between the opposing surfaces of the fixed and movable shells, and a spring pressed follower in each of said chambers for constantly urging the movement of the sealing substance from the chamber between the opposing faces of the fixed and movable walls.

5. In a vehicle wheel assembly, comprising a stationary and a rotary part, means for transferring air under pressure from one of said parts to the other, comprising a pair of annular shells arranged in concentric relation and concentrically with the wheel, each of said shells including a side wall portion and inner and outer concentric circular walls, each shell being open at the side opposite its side wall, said shells being in nested relation whereby the inner and outer walls of one are enclosed between the inner and outer walls of the other and the open sides of the shells are oppositely directed, each of said shells including a central annular slotted wall open at its free edge, the slotted wall of one shell being extended into the slotted wall of the other shell, an air pipe connected with each of said shells and in communication with the interior of the slotted wall thereof, one of said shells being secured to the fixed portion of the wheel assembly, the other of the shells being attached to the rotating portion of the wheel assembly, the nested shells forming a pair of annular chambers between which the slotted walls are located, said chambers being designed to contain a sealing substance to be forced therefrom between the opposing surfaces of the fixed and movable shells, an annular piston within each of said chambers, and spring means normally urging the movement of each piston in its chamber in a direction to effect the movement of the sealing substance from the chamber to between the opposing faces of the fixed and movable walls of the shells.

6. In a vehicle wheel assembly including a fixed part and a rotating part, means for transferring air under pressure from one of said parts to the other, comprising a pair of annular shells each having a side wall and concentrically arranged inner and outer circular walls, each of the shells being open at the side opposite its side wall, a slotted wall integral with each side wall of each shell and disposed between the inner and outer walls thereof and open at its free edge, means for coupling an air pipe with each shell side wall for connection with the interior of the adjacent slotted wall, one of said shells having the open side thereof extended into the open side of the other shell whereby the inner and outer walls are in concentric nested relation and the open edge of one slotted wall is extended into the other slotted wall, means coupling the shells together for relative rotary movement, one of said shells being fixed to the stationary portion of the wheel assembly, a plurality of ears carried by the outer wall of the other shell, a contractile spring coupling each of said ears with the rotary portion of the wheel assembly, said springs being so constructed and arranged as to effect a uniform radial pull upon the attached shell whereby the latter will be held in concentric relation with the other shell, the said nested shells forming two concentric chambers between which the slotted walls are located, said chambers being designed to contain a sealing substance for expulsion therefrom between the opposing surfaces of the fixed and movable walls, and means for effecting the expulsion of such substance from the chambers.

7. In a vehicle wheel assembly, means for transferring air under pressure from a fixed part of the assembly to a rotary part thereof, which comprises a body adapted to be secured to said fixed part and formed to provide an annular chamber arranged concentric with the axis of the wheel, an annular body formed to fit snugly in said chamber, means securing said annular body to the rotary part of the wheel assembly to turn therewith, said annular body having an air chamber therein opening into the annular chamber, means for connecting an air conducting pipe with the interior of each of said chambers, and means for maintaining a mobile air escape preventing seal between the confronting surfaces of the walls of the annular chamber and the annular body.

8. In a vehicle wheel assembly, means for transferring air under pressure from a fixed part of the assembly to a rotary part thereof, which comprises a body adapted to be secured to said fixed part and formed to provide an annular chamber arranged concentric with the axis of the wheel, an annular body formed to fit snugly in said chamber, means securing said annular body to the rotary part of the wheel assembly to turn therewith, said annular body having an air chamber therein opening into the annular chamber, means for connecting an air conducting pipe with the interior of each of said chambers, means forming a grease chamber upon the inner and outer sides of the first body, and means for forcing grease from the grease chambers between the inner faces of the walls of the annular chamber and the faces of the walls of the air chamber of the annular body which are opposed thereto to form an air escape preventing seal.

VERN W. EMBREE.
LELAND F. EMBREE.